United States Patent
Soave (10) Patent No.: US 11,426,960 B2
(45) Date of Patent: Aug. 30, 2022

(54) MOLDING DEVICE COMPRISING MOLD SHELLS AND A GASKET FOR MANUFACTURING AN OPHTHALMIC LENS CONFIGURED TO BE WORN BY A WEARER, SUCH A GASKET, AND A METHOD FOR MANUFACTURING SUCH A LENS

(71) Applicant: Essilor International, Charenton-le-Pont (FR)

(72) Inventor: Pascal Soave, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 214 days.

(21) Appl. No.: 16/828,064

(22) Filed: Mar. 24, 2020

(65) Prior Publication Data

US 2020/0331218 A1    Oct. 22, 2020

(30) Foreign Application Priority Data

Apr. 19, 2019 (EP) .................................... 19305515

(51) Int. Cl.
*B29D 11/00* (2006.01)
*B33Y 80/00* (2015.01)

(52) U.S. Cl.
CPC ......... *B29D 11/00528* (2013.01); *B33Y 80/00* (2014.12)

(58) Field of Classification Search
CPC ............................ B29D 11/00528; B33Y 80/00
See application file for complete search history.

(56) References Cited

U.S. PATENT DOCUMENTS

| | | | | |
|---|---|---|---|---|
| 3,404,861 A | * | 10/1968 | Ewer | B29D 11/00538 249/187.1 |
| 4,693,446 A | * | 9/1987 | Orlosky | B29C 33/0038 249/105 |
| 7,264,755 B2 | * | 9/2007 | Griffith | B29C 33/0011 264/1.1 |
| 2005/0179148 A1 | | 8/2005 | Tridon et al. | |
| 2009/0179339 A1 | * | 7/2009 | Katzman | B29C 33/0038 264/1.32 |
| 2010/0127413 A1 | | 5/2010 | Hosada | |
| 2018/0133987 A1 | | 5/2018 | Watanabe et al. | |

OTHER PUBLICATIONS

European Search Report dated Oct. 29, 2019 in European Application 19305515.9 filed Apr. 19, 2019, 7 pages.

* cited by examiner

*Primary Examiner* — Mathieu D Vargot
(74) *Attorney, Agent, or Firm* — Oblon, McClelland, Maier & Neustadt, L.L.P.

(57) ABSTRACT

A molding device includes mold shells and a gasket for manufacturing by molding an ophthalmic lens configured to be worn by a wearer, the mold shells each having a molding face and a peripheral side and the gasket including a closed loop portion sandwiched between the molding faces and remotely to the peripheral sides, thus forming a molding cavity of the ophthalmic lens inside the closed loop portion of the gasket, the gasket including a plurality of elongated positioning members each projecting externally from the closed loop portion and each being fastened on a said peripheral side of at least one of the mold shells, the elongated positioning members each having a respective length which is determined in function of an optical axis characteristic of the wearer.

15 Claims, 4 Drawing Sheets

MOLDING DEVICE COMPRISING MOLD SHELLS AND A GASKET FOR MANUFACTURING AN OPHTHALMIC LENS CONFIGURED TO BE WORN BY A WEARER, SUCH A GASKET, AND A METHOD FOR MANUFACTURING SUCH A LENS

FIELD OF THE INVENTION

The invention generally relates to manufacturing by molding ophthalmic lenses configured to be worn by wearers, and in particular to a molding device comprising mold shells and a gasket for manufacturing such lenses.

The invention also relates to such a gasket of the molding device and to a method for manufacturing such lenses thanks to such a molding device.

BACKGROUND ART

Manufacturing by molding ophthalmic lenses configured to be worn by wearers, and in particular molding devices comprising mold shells and gaskets for manufacturing such lenses are known.

For instance, patent application US 2005/0179148 discloses a molding device having spaced shells and an annular seal comprising means for cooperating with the periphery of the shells to define a molding cavity.

It is also known from patent application US 2018/0133987 to print thanks to a 3D printer a side peripheral lens mold directly on an internal surface of one of the molding shells in order to define the molding cavity.

In these patent applications both the annular seal and the side peripheral lens mold are configured to delimit the periphery of the molding cavity and thus the peripheral edge of the molded lens.

SUMMARY OF THE INVENTION

The invention is directed to a molding device comprising mold shells and a gasket which are particularly convenient to delimit a molding cavity and which are also simple, economic and easy to manufacture.

The invention accordingly provides a molding device comprising mold shells and a gasket for manufacturing by molding an ophthalmic lens configured to be worn by a wearer, said mold shells each having a molding face and a peripheral side and said gasket comprising a closed loop portion sandwiched between said molding faces and remotely to said peripheral sides of said mold shells, thereby forming a molding cavity of said ophthalmic lens inside said closed loop portion of said gasket, said gasket comprising a plurality of elongated positioning members each projecting externally from said closed loop portion and being each fastened on said peripheral side of at least one of said mold shells, said plurality of elongated positioning members each having a respective length which is determined in function of an optical axis characteristic of said wearer of said ophthalmic lens.

Thanks to the elongated positioning members of the gasket of the molding device according to the invention, said gasket is located such that the optical axis passes through the closed loop portion.

The optical axis characteristic of the wearer may be understood as being the optical axis of the ophthalmic lens and/or the optical axis of the eye of the wearer, that can be often referred to the "visual axis" of the eye of the wearer.

Such optical axis characteristic of the wearer can be defined for instance with respect to the center of rotation of the eye of the wearer.

The positioning members of the gasket of the molding device according to the invention allow to position the closed loop portion in any desired location between the molding faces and with respect to the peripheral sides of the mold shells of the molding device. Furthermore, the gasket and thus the closed loop portion can be positioned in a reliable and precise manner.

Accordingly, a wide variety of gaskets can be used with a limited number of mold shells for manufacturing a wide variety of ophthalmic lenses. It is thus possible to obtain a plurality of customized lenses, in function of the wearers, thanks to a molding device having a limited number of molds shells in which a large number of gaskets can be placed.

Advantageous features provided as being very simple, convenient and economical of the molding device according to the invention are proposed below.

Said elongated positioning members of said gasket may be configured for positioning said closed loop portion in a predetermined position between said molding faces and remotely to said peripheral side of said mold shells.

Said closed loop portion of said gasket may have a thickness and said thickness and said molding faces may be determined in function of a correction characteristic of said wearer of said ophthalmic lens.

Said closed loop portion of said gasket may have a shape which is determined in function of a frame configured to receive said ophthalmic lens worn by said wearer.

Said gasket may comprise a rib formed on said closed loop portion in order to form a groove in said ophthalmic lens which is configured to receive a complementary fastening member of said frame.

Said plurality of elongated positioning members of said gasket may be spaced along said closed loop portion.

Said elongated positioning members may each comprise an elongated arm extending from said closed loop portion and at least one finger extending from an end of said elongated arm opposite to said closed loop portion and being grabbed on said peripheral side of at least one of said mold shells.

Said elongated positioning members may be fastened on said peripheral side of at least one of said mold shells at respective locations which are regularly spaced from each other.

Said gasket may comprise an injection hole formed in said closed loop portion for injecting a material into said molding cavity.

Said molding device may comprise a clamping member configured to press said mold shells against said gasket.

The invention further provides a gasket of a molding device for manufacturing by molding an ophthalmic lens configured to be worn by a wearer, comprising a closed loop portion forming a molding cavity of said ophthalmic lens and a plurality of elongated positioning members each projecting externally from said closed loop portion, said plurality of elongated positioning members each having a length which is determined in function of an optical axis characteristic of said wearer of said ophthalmic lens.

Advantageous features provided as being very simple, convenient and economical of the gasket according to the invention are proposed below.

Said closed loop portion of said gasket may have a thickness and said thickness and said molding faces may be determined in function of a correction characteristic of said wearer of said ophthalmic lens.

Said closed loop portion of said gasket may have a shape which is determined in function of a frame configured to receive said ophthalmic lens worn by said wearer.

Said gasket may comprise a rib formed on said closed loop portion in order to form a groove in said ophthalmic lens which is configured to receive a complementary fastening member of said frame.

Said plurality of elongated positioning members of said gasket may be spaced along said closed loop portion.

Said elongated positioning members may each comprise an elongated arm extending from said closed loop portion and at least one finger extending from an end of said elongated arm opposite to said closed loop portion and configured to be grabbed on said peripheral side of at least one of said mold shells.

The invention also provides a method for manufacturing by molding an ophthalmic lens configured to be worn by a wearer, thanks to a molding device comprising mold shells and a gasket, comprising the steps of:

providing said mold shells each having a molding face and a peripheral side;

providing said gasket comprising a closed loop portion and a plurality of elongated positioning members each projecting externally from said closed loop portion and having a respective length which is determined in function of an optical axis characteristic of said wearer of said ophthalmic lens;

assembling said gasket and said mold shells by sandwiching said closed loop portion between said molding faces and remotely to said peripheral sides of said mold shells, thereby forming a molding cavity of said ophthalmic lens inside said closed loop portion of said gasket, and by fastening said plurality of elongated positioning members on said peripheral side of at least one of said mold shells.

Advantageous features provided as being very simple, convenient and economical of the method according to the invention are proposed below.

Said gasket may comprise an injection hole formed into said closed loop portion and said method may comprise the step of injecting a material into said molding cavity through said injection hole.

Said gasket may be additively manufactured, for instance by inkjet printing of a polymer, or by stereolithography, or by selective laser melting, or by thermoplastic filament extrusion.

Said gasket may comprise a core which is made from a first material and a sheath wrapping said core and which is made from a second material softer than said first material.

BRIEF DESCRIPTION OF THE DRAWINGS

The description of the invention now continues with a detailed description of embodiments given hereinafter by way of non-limiting example and with reference to the appended drawings. These drawings include the following Figures.

DETAILED DESCRIPTION

Figure 1:
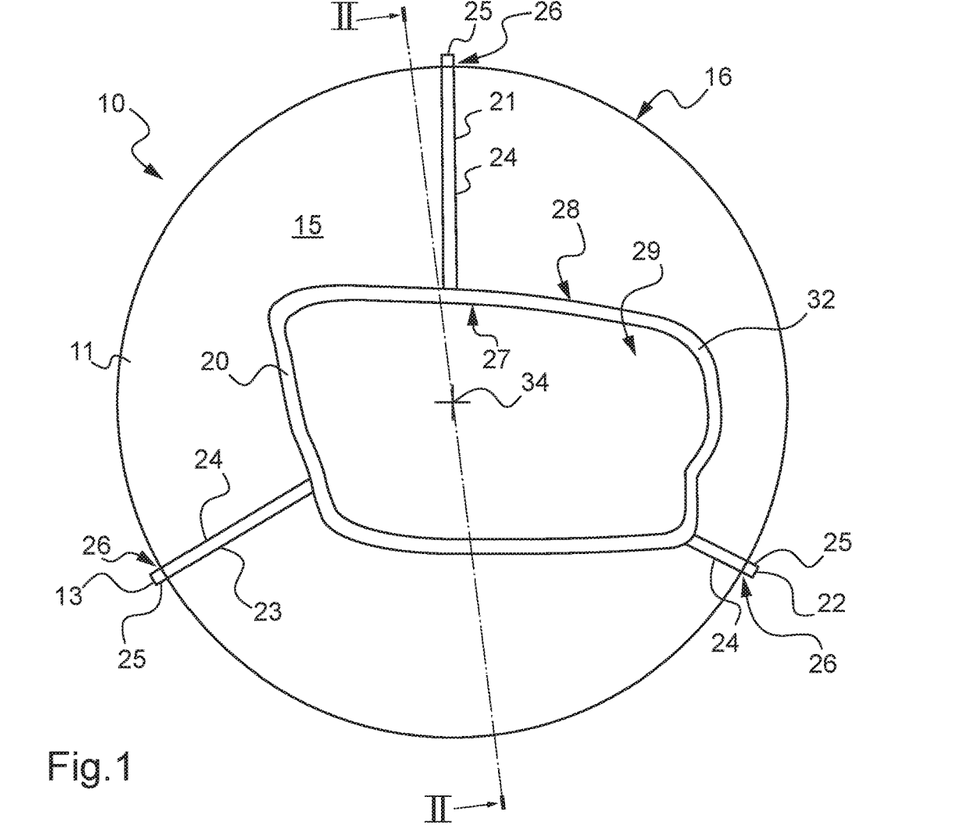
FIG. 1 is a schematic elevation view of a molding device according to the invention, comprising mold shells and a gasket for manufacturing by molding an ophthalmic lens configured to be worn by a wearer.
Figure 2:
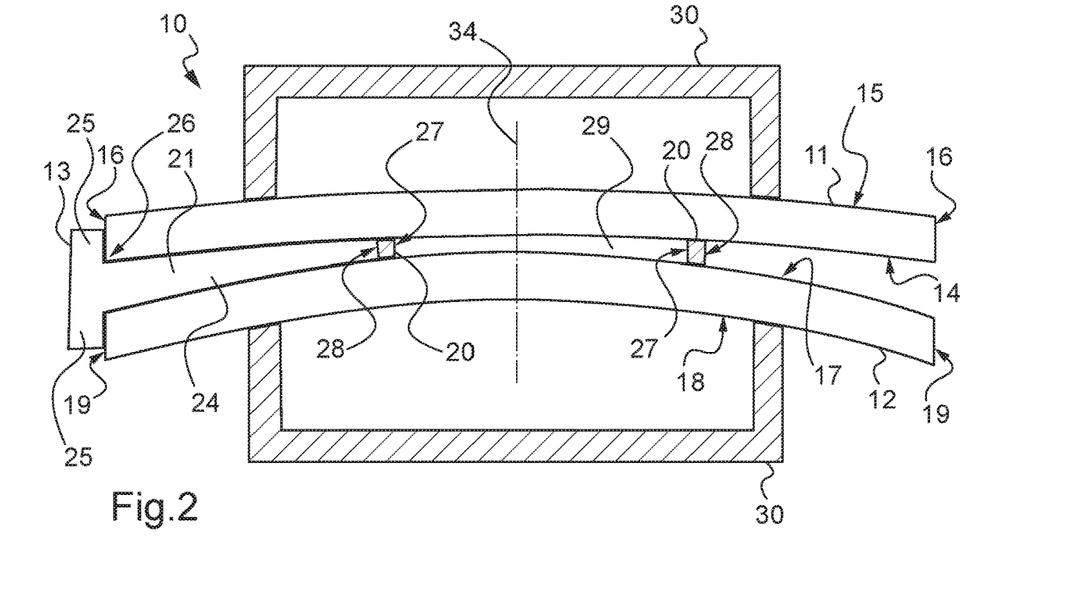
FIG. 2 is the cross sectional view identified II-II on FIG. 1, the molding device further comprising a clamping member configured to press the mold shells.

FIGS. 1 and 2 illustrate a molding device 10 for manufacturing by molding an ophthalmic lens configured to be worn by a wearer.

Figure 3:
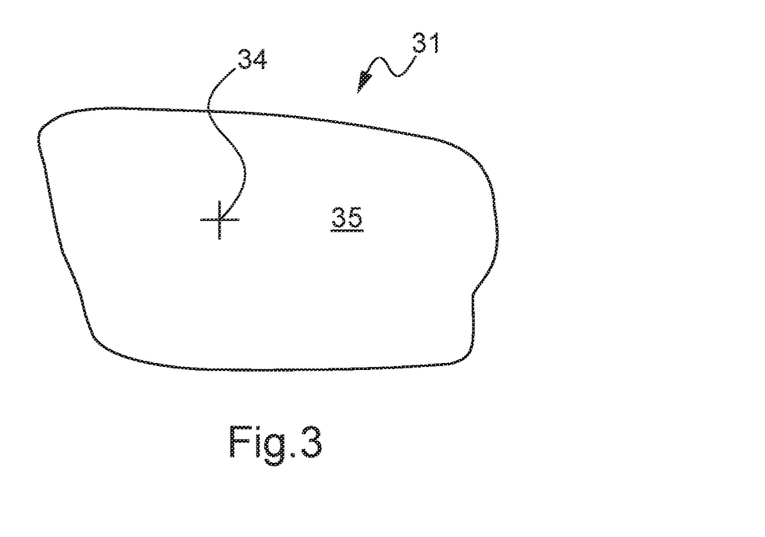
FIG. 3 is a view of the ophthalmic lens obtained with the molding device.

Such an ophthalmic lens 31 obtained from the molding device 10 is illustrated on FIG. 3.

The ophthalmic lens 31 is configured to provide a correction characteristic of the wearer. Such correction may be a visual correction required for an eye of the wearer.

The ophthalmic lens 31 is configured to provide the visual correction required for an eye of the wearer, provided that the lens 31 is in a proper position with respect to an optical axis 34 characteristic of the wearer of the ophthalmic lens 31.

Such an optical axis may be the visual axis 34 of the eye of the wearer.

The visual axis 34 of the eye may be the optical axis of the crystalline lens passing through the center of rotation of the eye.

The proper position of the visual axis 34 with respect to the ophthalmic lens 31 is shown by a cross on FIG. 3.

The proper position of the visual axis 34 may be identified with coordinates including the pupillary distance and the pupillary height.

The pupillary distance may be measured according to a temporal-nasal direction, with respect to the nose and/or with respect to the pupil of the other eye.

The pupillary height may be measured according to a forehead-chin direction, with respect to a virtual line that is tangent to the bottom of the frame configured to receive the ophthalmic lens 31. Such a virtual line may be a side of a virtual rectangular frame, also called "boxing", the sides of which are each tangent to the frame.

Accordingly, the position of the visual axis 34 with respect to the ophthalmic lens 31 is to be taken into account when manufacturing the ophthalmic lens 31 and the ophthalmic lens 31 is associated to this visual axis 34.

The ophthalmic lens 31 comprises a front optical face 35 and a rear optical face (not visible) each having a respective shape determining the optical characteristics of the ophthalmic lens 31, including the visual correction.

The molding device 10 comprises a first mold shell 11, a second mold shell 12 and a gasket 13 assembled to form a molding cavity 29. In particular, the gasket 13 is located between the first mold shell 11 and the second mold shell 12.

On FIG. 1, the gasket 13 is visible by transparency through the first and second mold shells 11 and 12.

The molding cavity 29 is configured to receive a material able to polymerize—or polymerizable material—when subjected to predetermined conditions.

Such material is initially in a liquid state for filling the cavity 29 and is then polymerized in situ for obtaining the ophthalmic lens 31.

The predetermined conditions may include irradiating the material with ultra-violet (UV) light.

The molding device 10 may comprise a clamping member 30 configured to press the first mold shell 11 and the second mold shell 12 against the gasket 13.

The first mold shell 11 comprises a first internal face 14, a first external face 15 opposite to the first internal face 14, and a peripheral side 16 connecting the first internal face 14 to the first external face 15.

The first internal face 14 may be concave, the first external face 15 may be convex and the peripheral side 16 may have a circular contour.

The first internal face 14 is configured for conforming by molding the front optical face 35 of the ophthalmic lens 31 and is hereinafter referred to as first molding face 14.

The second mold shell 12 comprises a second internal face 17, a second external face 18 opposite to the second internal face 17, and a peripheral side 19 connecting the second internal face 17 to the second external face 18.

The second internal face 17 may be convex, the second external face 18 may be concave and the peripheral side 19 may have a circular contour.

The second internal face 17 is configured for conforming by molding the rear optical face of the ophthalmic lens 31 and is hereinafter referred to as second molding face 17.

As mentioned above, the front optical face 35 and the rear optical face of the ophthalmic lens 31 each have a respective shape determining the optical characteristics of the ophthalmic lens 31, including the visual correction required for the eye of the wearer.

The first and second molding faces 14 and 17 may thus be determined in function of the visual correction required for the eye of the wearer.

The first and second mold shells 11 and 12 may thus be provided in function of the visual correction required for the eye of the wearer.

The first and second molding faces 14 and 17 are for instance spherical and thus may be configured for molding a spherical ophthalmic lens.

The first and second mold shells 11 and 12 may have the same diameter and their respective peripheral sides 16 and 19 may have the same contour.

The first and second mold shells 11 and 12 are for instance made of a relatively thick glass, that may be transparent at least to UV light.

On FIGS. 1 and 2, the position of the visual axis 34 to which the ophthalmic lens 31 is to be associated is shown by a cross and a dashed line respectively.

The position of the visual axis 34 with respect to the first and second mold shells 11 and 12 is determined in function of the correction required for the eye.

For example, for most corrections it may be required that the visual axis 34 coincide with the optical axis of the ophthalmic lens 31.

In such case, the position determined for the visual axis 34 may be such that the visual axis 34 coincides with the axis of rotational symmetry of the first molding face 14 and/or of the second molding face 17.

The axis of rotational symmetry of the first and second molding faces 14 and 17 here coincide.

The gasket 13 comprises a closed loop portion 20 and a plurality of elongated positioning members each projecting externally from the closed loop portion 20.

For instance, the gasket 13 may comprise three positioning members 21, 22 and 23.

The positioning members 21, 22 and 23 may be spaced along the closed loop portion 20.

The closed loop portion 20 has an outer face 28 from which project the positioning members 21, 22 and 23, and an inner face 27, opposite to the outer face 28, directed towards the inside of the closed loop portion 20.

The inner face 27 thus delimits the molding cavity 29.

As visible on FIG. 1, the inner face 27 thus corresponds to the outline that is to be given to the ophthalmic lens 31.

The outline to be given to the ophthalmic lens 31 may be determined in function of a frame configured to receive the ophthalmic lens 31, for instance a frame previously selected by the wearer.

The shape of the closed loop portion 20, and in particular the shape of its inner face 27, may thus be determined in function of such a frame.

The positioning members 21, 22 and 23 each comprise an elongated arm 24 extending from the closed loop portion 20 and at least one finger 25 extending from an end 26 of the elongated arm 24 opposite to the closed loop portion 20.

For instance, the positioning members 21, 22 and 23 may each comprise two fingers 25 arranged in a T-shape with the elongated arm 24.

The first and second mold shells 11 and 12 are arranged with their respective first and second molding faces 14 and 17 facing each other.

The respective peripheral sides 16 and 19 of the first and second mold shells 11 and 12 may be in line with each other.

The gasket 13 is interposed between the first and second mold shells 11 and 12.

The closed loop portion 20 is sandwiched between the first and second molding faces 14 and 17, remotely to the peripheral sides 16 and 19, thereby forming the molding cavity 29 inside the closed loop portion 20.

As stated above, the molding cavity 29 is delimited by the inner face 27 of the loop portion 20 and by respective portions of the first and second molding faces 14 and 17.

The elongated positioning members 21, 22 and 23 each have a respective length which is determined in function of the visual axis 34.

In addition, the closed loop portion 20 may be located in a predetermined position between the first and second molding faces 14 and 17, such position being determined in function of the visual axis 34.

The elongated positioning members 21, 22 and 23 may in this case be configured for positioning the closed loop portion 20 in the predetermined position between the first and second molding faces 14 and 17 and remotely to the peripheral sides 16 and 19.

The thickness of the ophthalmic lens 31 may also have an influence on the optical characteristics of the ophthalmic lens 31, including the visual correction required for the eye of the wearer.

The thickness of the ophthalmic lens 31 may thus be determined in function of the visual correction required for the eye of the wearer.

As visible on FIG. 2, the thickness of the ophthalmic lens 31 is set, in particular, by the thickness of the closed loop portion 20.

The thickness of the closed loop portion 20 is thus determined in function of the visual correction required for the eye of the wearer. The gasket 13 comprises an injection hole 32 formed in the closed loop portion 20 for injecting the polymerizable material into the molding cavity 29.

The injection hole 32 opens both through the inner face 27 and the outer face 28.

The thickness of the gasket 13 may vary along the closed loop portion 20. The injection hole 32 may thus be formed in a thickest portion of the closed loop portion 20.

The clamping member 30 is configured to exert a force ensuring that a sealing contact exists between the closed loop portion 20 and the first and second molding faces 14 and 17 of the first and second mold shells 11 and 12.

As visible on FIG. 2, each of the elongated arms 24 is in contact all along its length with both the first molding face 14 and the second molding face 17. This may help to provide a balanced support between the gasket 13 and the first and second mold shells 11 and 12 when the latter are pressed against the gasket 13 by the clamping member 30.

The shape of the positioning members 21, 22 and 23 may thus be determined in function of the shape of the first molding face 14 and/or the second molding face 17.

For each positioning member 21, 22 and 23, a first one of the two fingers 25 may be grabbed on the peripheral side 16 of the first mold shell 11 and a second one of the two fingers 25 may be grabbed on the peripheral side 19 of the second mold shell 12.

The positioning members 21, 22 and 23 are thus each fastened at a respective location on at least one of the peripheral sides 16 and 19 of the first and second mold shells 11 and 12.

The respective locations may be regularly spaced from each other. In the embodiment shown on FIG. 1, the respective locations are spaced by an angle of about 120°.

When assembling the gasket 13 to the first and second mold shells 11 and 12 for forming the molding device 10, the positioning members 21, 22 and 23 prevent the gasket 13 from moving, at least according to a radial direction, with respect to the first and second mold shells 11 and 12.

The positioning members 21, 22 and 23 can thus ensure that the closed loop portion 20 remains in the predetermined position with respect to the first and second molding faces 14 and 17.

Figure 4:
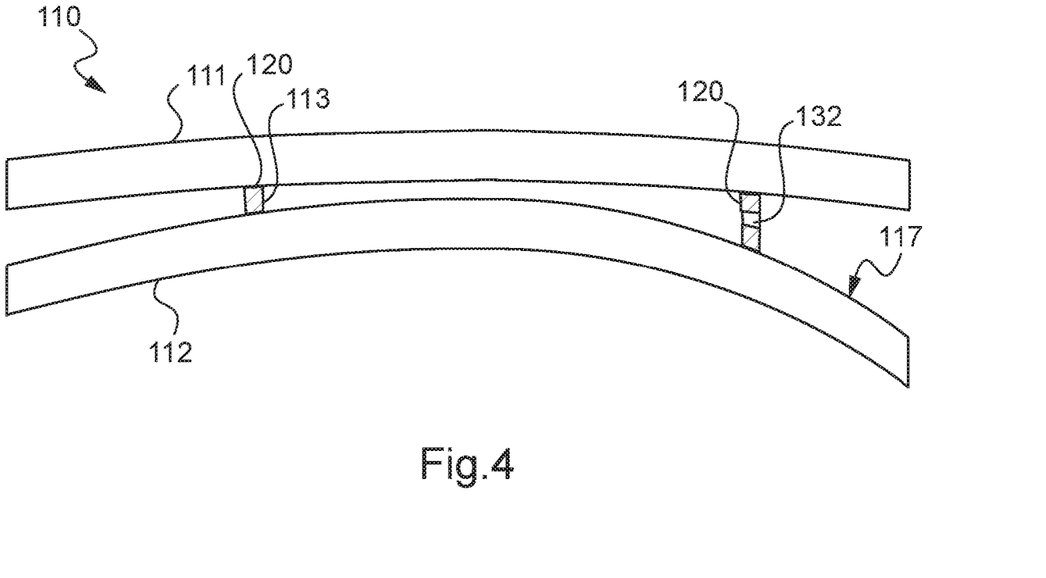
FIG. 4 is a view similar to FIG. 2 of another embodiment of the molding device, the clamping member not being shown.

FIG. 4 illustrates another embodiment 110 of the molding device. In the following the numeral references are increased by 100 for corresponding elements between the molding device 110 and the molding device 10.

The molding device 110 is similar to the molding device 10, except that the second molding face 117 is toroidal. The molding device 110 comprises a first mold shell 111 and a second mold shell 112. The thickness of the gasket 113 may thus vary along the closed loop portion 120 much more than for the molding device 10. The injection hole 132 may thus be formed in a thickest portion of the closed loop portion 120.

Figure 5:
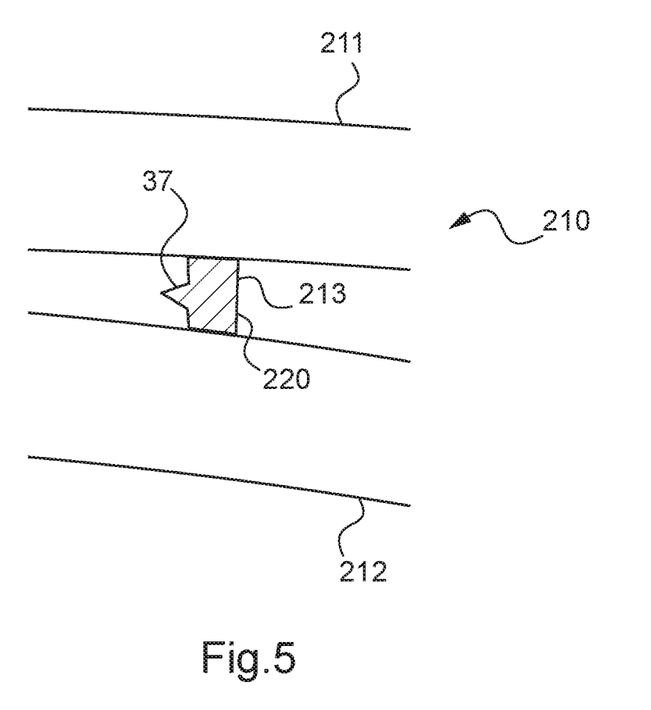
FIG. 5 is a view similar to FIGS. 2 and 4 showing a detail of still another embodiment of the molding device in which the gasket is provided with a rib.

FIG. 5 illustrates another embodiment 210 of the molding device. In the following the numeral references are increased by 200 for corresponding elements between the molding device 210 and the molding device 10. The molding device 210 comprises a first mold shell 211 and a second mold shell 212. The molding device 210 is similar to the molding device 10, except that the gasket 213 comprises a rib 37 formed on the closed loop portion 220 in order to form a groove (not illustrated) in the ophthalmic lens obtained by the molding device 210. Such a groove may be configured to receive a complementary fastening member of a frame (not illustrated) configured to receive such an ophthalmic lens, for instance a frame previously selected by the wearer.

The complementary fastening member may comprise a rib.

The frame may comprise a rim having an inner side configured to cooperate with the periphery of the ophthalmic lens 31, and the rib may be formed on the inner side of the rim.

The rim may be entirely annular or partially annular.

Figure 7:
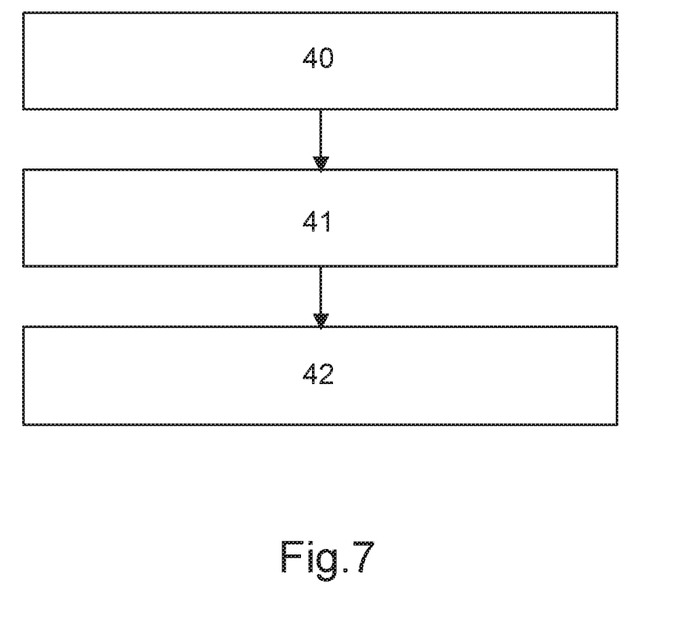
FIG. 7 is a diagram illustrating a method for manufacturing by molding the ophthalmic lens, thanks to the molding device.

It will now be described a method for manufacturing by molding the ophthalmic lens 31 thanks to the molding device 10, with reference to FIG. 7.

Such a method comprises the step 40 of providing the first and second mold shells 11 and 12, the first mold shell 11 having the first molding face 14 and the peripheral side 16, the second mold shell 12 having the second molding face 17 and the peripheral side 19.

For obtaining the molding device 10, the first and second mold shells 11 and 12 may be selected taking into account the visual correction required for the eye of the wearer.

More specifically, the shape of the front and rear optical faces of the ophthalmic lens 31 may be determined based on the visual correction required for the eye of the wearer and the first and second mold shells 11 and 12 may be selected such that the first molding face 14 is able to conform by molding the front optical face 35 and such that the second molding face 17 is able to conform by molding the rear optical face.

Such a method further comprises the step 41 of providing the gasket 13 comprising the closed loop portion 20 and the plurality of elongated positioning members 21, 22 and 23 each projecting externally from the closed loop portion 20 and having a respective length which is determined in function of the visual axis 34 of the eye of the wearer when the ophthalmic lens is worn by the wearer.

The gasket 13 may be manufactured by taking into account the outline to be given to the ophthalmic lens 31 and/or the predetermined position of the closed loop portion 20 between the first and second molding faces 14 and 17. Such predetermined position may be determined in function of the visual axis 34 and/or of the respective shapes of the first and second molding faces 14 and 17.

The gasket 13 may be obtained by additive manufacturing, for instance using a three-dimensional printer. The additive manufacturing may include inkjet printing of a polymer, stereolithography, selective laser melting and/or thermoplastic filament extrusion.

The three-dimensional printer may be connected to a control and command unit configured to determine the shape of the gasket 13 based on the outline to be given to the ophthalmic lens 31 and/or the predetermined position of the closed loop portion 20 between the first and second molding faces 14 and 17 as explained above.

The control and command unit may further be configured to determine the position of the closed loop portion 20 between the first and second molding faces 14 and 17 based on data characteristic of the correction required for the wearer, such as the power of the ophthalmic lens, the pupillary distance and the pupillary height.

The gasket 13 may be made of a flexible material configured to compensate for the shrinkage of the polymerizable material during polymerization. The gasket 13 may be manufactured by taking into account such shrinkage.

The material of the gasket 13 may include materials selected for instance in the group of thermoplastic elastomers (TPE) and/or materials selected in the group of Styrene Ethylene Butylene Styrene (SEBS).

Such a method further comprises the step 42 of assembling the gasket 13 and the first and second mold shells 11 and 12 by sandwiching the closed loop portion 20 between the molding faces 14 and 17 and remotely to the peripheral sides 16 and 19 of the first and second mold shells 11 and 12, thereby forming the molding cavity 29 of the ophthalmic lens 31 inside the closed loop portion 20 of the gasket 13, and by fastening the plurality of elongated positioning members 21, 22 and 23 on the peripheral side 16 and/or 19 of at least one of the first and second mold shells 11 and 12.

For manufacturing the ophthalmic lens 31, the molding cavity 29 may be filled through the injection hole 32 with the polymerizable material; and the latter may then be irradiated with UV light in order to polymerize. The first and second molds shells 11 and 12, as well as the gasket 13 may then be separated from each other and the ophthalmic lens 31 may be obtained.

Figure 6:
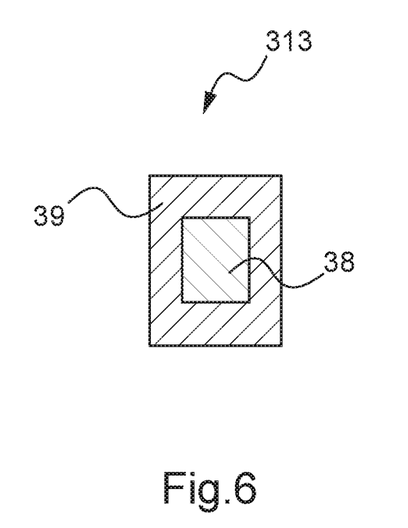
FIG. 6 is a cross sectional view of a variant of the gasket, comprising a core and a sheath.

FIG. 6 illustrates another embodiment of the gasket 313, the latter being shown in cross section. The gasket 313 is similar to the gasket 13, except that the gasket 313 comprises a core 38 which is made from a first material and a sheath 39 wrapping the core 38 and which is made from a second material softer than the first material.

The first and the second material may include materials for instance selected in the group of thermoplastic elastomers (TPE) and/or materials selected in the group of Styrene Ethylene Butylene Styrene (SEBS).

The materials in such groups may be of different hardness that may be selected appropriately for obtaining the first and the second materials.

The first material may further include a thermoplastic material such as acrylonitrile butadiene styrene (ABS).

The gasket 313 may be manufactured as the gasket 13, the core and/or the sheath being obtained for instance by additive manufacturing.

Of course the method for manufacturing by molding an ophthalmic lens configured to be worn by a wearer described above may be carried out with other molding devices, similar to the molding device 10 described above, such as with molding devices 110 and 210, and/or with the gasket 313. In a variant, the correction may require a prismatic effect and the visual axis may thus be shifted with respect to the optical axis of the ophthalmic lens.

For instance, the position determined for the visual axis with respect to the first and second mold shells may be such that the visual axis is shifted with respect to the axis of rotational symmetry of the first molding face and/or of the second molding face In a variant, the optical axis characteristic of the wearer of the ophthalmic lens may be different from the visual axis, and may be for instance the optical axis of the ophthalmic lens configured to provide the required correction to the wearer.

It should be noted that in such case, it is not necessary that the elongated positioning members be configured for positioning the closed loop portion in a predetermined position between the molding faces. Indeed, it is sufficient that the gasket be located such that the optical axis of the ophthalmic lens passes through the closed loop portion; and in a subsequent step, the frame selected by the wearer may be configured such that the visual axis is in the proper position with respect to the ophthalmic lens when worn by the wearer, for instance by having the visual axis of the wearer to coincide with the optical axis of the ophthalmic lens.

In a variant, the complementary fastening member of the frame may comprise a thread, for instance made of nylon.

The frame may comprise a partially annular rim, also called half-rim, configured to cooperate with a portion of the periphery of the ophthalmic lens, and the thread may be configured to engage the groove in another portion of the ophthalmic lens that is not cooperating with the half-rim.

The fastening member may further comprise a rib formed on the half-rim, for instance on its inner side.

The rib of the gasket may be configured to form a first portion of the groove in said ophthalmic lens which is configured to receive the rib of the frame and a second portion of the groove in said ophthalmic lens which is configured to receive the thread of the frame.

In further variants that are not illustrated:
the first and second mold shells have different diameters and/or their peripheral sides have different respective contours;
the first molding face is convex and/or the second molding face is concave;
the gasket comprises less or more than three elongated positioning members, for example one, two, four, five or more elongated positioning members;
at least one of the elongated positioning member is fastened on the peripheral side of only one of the mold shells;
at least one of the elongated positioning members has only one finger and such finger is arranged in an L-shape with the elongated arm; and/or
at least one of the elongated arms is at distance from at least one of the molding faces of the mold shells; and/or
the predetermined conditions for polymerizing the material of the lens include another method than irradiating the material with UV light, for example heating the material.

It should be noted more generally that the invention is not limited to the examples described and represented.

The invention claimed is:

1. A molding device comprising:
mold shells and a gasket for manufacturing by molding an ophthalmic lens configured to be worn by a wearer, said mold shells each having a molding face and a peripheral side and said gasket comprising a closed loop portionsandwiched between said molding faces and remotely to said peripheral sides of said mold shells, thereby forming a molding cavity of said ophthalmic lens inside said closed loop portion of said gasket, said gasket comprising a plurality of elongated positioning members each projecting externally from said closed loop portion and each being fastened on a said peripheral side of at least one of said mold shells, said plurality of elongated positioning members each having a respective length which is determined as a function of an optical axis characteristic of said wearer of said ophthalmic lens.

2. The molding device according to claim 1, wherein said elongated positioning members of said gasket are configured for positioning said closed loop portion in a predetermined position between said molding faces and remotely to said peripheral sides of said mold shells.

3. The molding device according to claim 1, wherein said closed loop portion of said gasket has a thickness and said thickness and said molding faces are determined as a function of a correction characteristic of said wearer of said ophthalmic lens.

4. The molding device according to claim 1, wherein said closed loop portion of said gasket has a shape which is determined as a function of a frame configured to receive said ophthalmic lens worn by said wearer.

5. The molding device according to claim 4, wherein said gasket comprises a rib formed on said closed loop portion in order to form a groove in said ophthalmic lens which is configured to receive a complementary fastening member of said frame.

6. The molding device according to claim 1, wherein said plurality of elongated positioning members of said gasket are spaced along said closed loop portion.

7. The molding device according to claim 1, wherein said elongated positioning members each comprise an elongated arm extending from said closed loop portion and at least one finger extending from an end of said elongated arm opposite to said closed loop portion and being grabbed on said peripheral side of at least one of said mold shells.

8. The molding device according to claim 1, wherein said elongated positioning members are fastened on said peripheral side of at least one of said mold shells at respective locations which are regularly spaced from each other.

9. The molding device according to claim 1, wherein said gasket comprises an injection hole formed in said closed loop portion for injecting a material into said molding cavity.

10. The molding device according to claim 1, comprising a clamping member configured to press said mold shells against said gasket.

11. A gasket of a molding device for manufacturing by molding between mold shells of said molding device an ophthalmic lens configured to be worn by a wearer, comprising a closed loop portion forming a molding cavity of said ophthalmic lens and a plurality of elongated positioning members each projecting externally from said closed loop portion, said plurality of elongated positioning members each having a length which is determined as a function of an optical axis characteristic of said wearer of said ophthalmic lens.

12. A method of assembly for manufacturing by molding an ophthalmic lens configured to be worn by a wearer, te using a molding device comprising mold shells and a gasket, comprising:

providing said mold shells each having a molding face and a peripheral side;

providing said gasket comprising a closed loop portion and a plurality of elongated positioning members each projecting externally from said closed loop portion and having a respective length which is determined as a function of an optical axis characteristic of said wearer of said ophthalmic lens; and assembling said gasket and said mold shells by sandwiching said closed loop portion between said molding faces and remotely to said peripheral sides of said mold shells, thereby forming a molding cavity of said ophthalmic lens inside said closed loop portion of said gasket, and by fastening said plurality of elongated positioning members on said peripheral side of at least one of said mold shells.

13. The method according to claim 12, wherein said gasket comprises an injection hole formed into said closed loop portion and said method comprises the step of injecting a material into said molding cavity through said injection hole.

14. The method according to claim 12, wherein said gasket is additively manufactured, by inkjet printing of a polymer, or by stereolithography, or by selective laser melting, or by thermoplastic filament extrusion.

15. The method according to claim 14, wherein said gasket comprises a core which is made from a first material and a sheath wrapping said core and which is made from a second material softer than said first material.

* * * * *